May 8, 1962 A. F. BEHNKE 3,033,589
SPRING SUSPENSION FOR DUAL AXLES FOR TRAILERS
Filed March 7, 1960 2 Sheets-Sheet 1
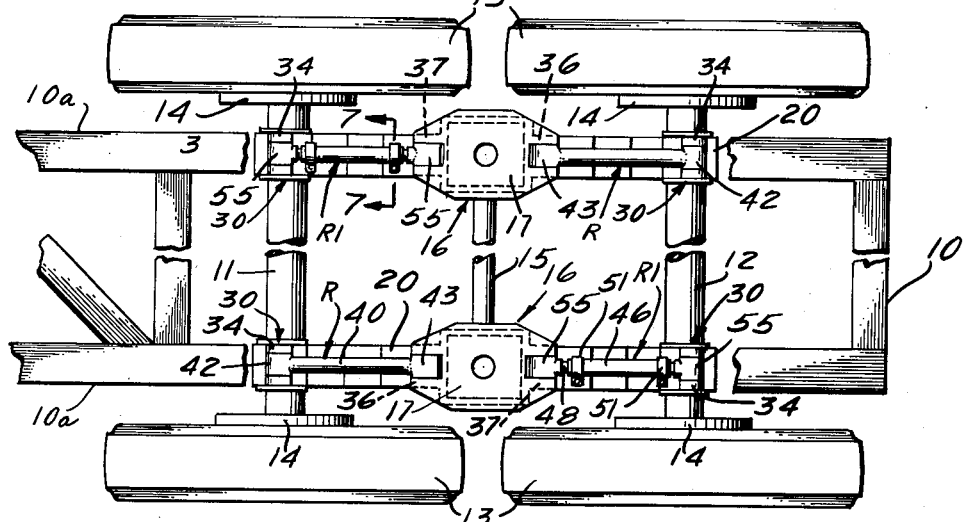
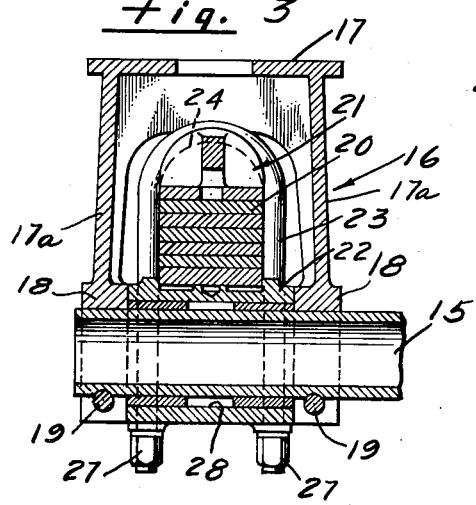
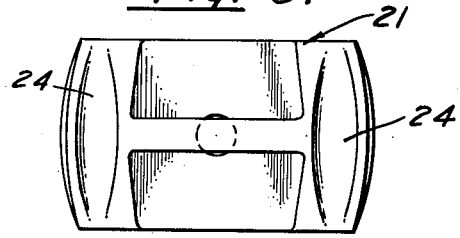
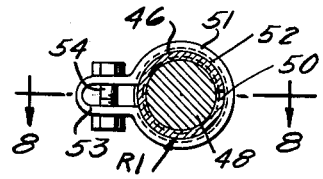
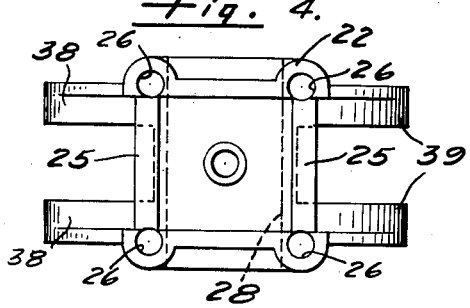
Arnold F. Behnke,
INVENTOR.
BY
Attorney

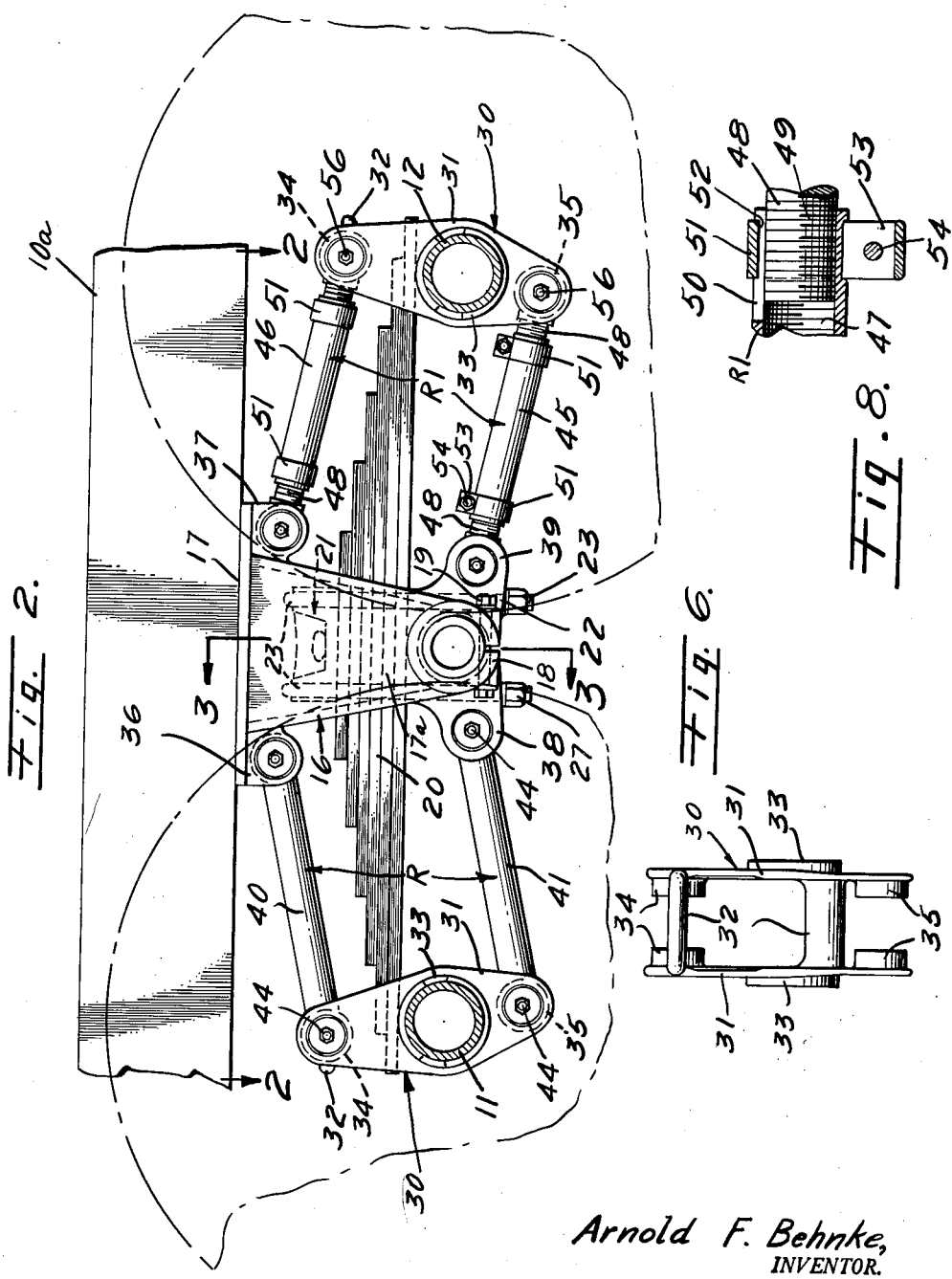

United States Patent Office 3,033,589
Patented May 8, 1962

3,033,589
SPRING SUSPENSION FOR DUAL AXLES FOR TRAILERS
Arnold F. Behnke, Los Angeles, Calif., assignor to Kay-Brunner Steel Products, Inc., a corporation of Delaware
Filed Mar. 7, 1960, Ser. No. 13,251
9 Claims. (Cl. 280—104.5)

My invention relates to spring suspensions for dual axles for trailers or other wheeled vehicles, particularly of the type embodying radius rods in a parallelogram arrangement, and a curved leaf spring supported at its opposite ends on the axles and its medial portion pivotally supported on a trunnion shaft extending transversely of the vehicle frame.

Suspensions of this character as heretofore proposed are ineffective to positively prevent "hopping" of the wheels as mounted on the axles, that is, bouncing of the wheels on the ground when the brakes are applied to the wheels particularly when traversing undulated roads since they do not completely absorb the brake-torque reaction and thus allow uncontrolled oscillation of the suspension resulting in damage to the entire suspension structure.

It is a purpose of my invention to provide a spring suspension of this character which effectively absorbs brake-torque reaction and driving-torque reaction if either or both of the axles are driven, and so as to eliminate wheel hopping, and in such manner as to prevent damage to any of the parts of the suspension.

It is also a purpose of my invention to provide a spring suspension which embodies two pairs of radius rods at each end of the trunnion, and wherein diagonally opposite pairs of rods are adjustable lengthwise in order to position and secure the axles in proper alinement with the trunnion.

It will describe only one form of spring suspension for dual axles for vehicles embodying my invention and will then point out the novel features thereof in claims.

In the accompanying drawings:

FIG. 1 is a view showing in top plan one form of spring suspension embodying my invention in association with a vehicle frame;

FIG. 2 is an enlarged view showing the spring suspension and vehicle frame in side elevation;

FIG. 3 is an enlarged vertical sectional view taken on the line 3—3 of FIG. 2;

FIG. 4 is a detailed top plan view of one of the spring seats embodied in the suspension;

FIG. 5 is a detailed top plan view of the spring saddle embodied in the suspension;

FIG. 6 is a detail side elevational view of one of the torque brackets embodied in the suspension;

FIG. 7 is an enlarged vertical sectional view taken on the line 7—7 of FIG. 7; and FIG. 8 is a sectional view taken on the line 8—8 of FIG. 7.

Referring now to FIGS. 1 and 2 my invention is shown as applied to a dual-axle trailer or other form of vehicle, a portion of the frame 10 of the trailer being shown and of a construction to provide side members 10a. The dual axles are indicated at all 11 and 12 and they extend transversely of the frame 10 with their ends having wheels 13 rotatably mounted thereon, and individual brakes 14 of any desired form for controlling rotation of the wheels. It will be understood that my invention is susceptible of application to the dual rear axles of a truck wherein either or both of the axles are driven from a shaft contained in the trunnion and drivingly connected to the axles.

FIG. 2 shows only one side of the spring suspension embodying my invention, it being understood that the suspension on the opposite side of the frame 10 is a mirror image of that to be described with the single exception of the arrangement of the lengthwise adjustable radius rods at one side of the frame with respect to those at the other side of the frame.

As shown in FIGS. 1 and 2, a trunnion 15 extends transversely of the frame 10 between the axles 11 and 12, and each end of the trunnion is suspended from the frame by means of a hanger 16. Each hanger is of inverted U-form in cross section as best shown in FIG. 3, and its flat top 17 is welded to the bottom of the side frame member 10a. The parallel portions 17a of the hanger 16 are formed at their lower ends with annular and alined collars 18 for receiving one end of the trunnion 15, and these collars are split so that they may be constricted by bolts 19 to securely clamp the trunnion to the hanger.

A spring beam 20, shown as a multi-leaf spring, has its ends resting for sliding movement on the axles 11 and 12, while the medial portion of the beam extends through the hanger 16 and is mounted for rocking movement on the trunion 15 by means of a saddle member 21 contained within the hanger, a seat member 22, and U-bolts 23.

The saddle 21 has a flat bottom and a rounded top, as best shown in FIG. 5, formed with grooves 24 receiving the bight portions of the bolts. As shown in FIG. 4 the seat member 22 is of square form with a top formed with spaced flanges 25 between which the lowermost leaf of the beam 20 is received, as clearly shown in FIG. 3. At the corners of the seat member 22 vertical openings 26 are formed to receive the parallel portions of the bolts 23, with the lower ends of the bolts projecting therefrom and provided with nuts 27 for adjusting the bolts to clamp the beam 20 between the saddle member and the seat member.

The seat member 22 is constructed to provide a sleeve 28 in which the end of the trunnion 15 is received to allow rotation of the seat on the trunnion, and since the seat is clamped to the spring beam 20, the latter is mounted for rocking movement on the trunnion.

On the same end of each axle 11 and 12 is fixed a torque bracket 30, and as best shown in FIG. 6, the bracket has parallel portions 31 secured one to the other by cross members 32, and between their ends formed with alined and flanged openings 33 through which the axle end extends and is welded as well as otherwise secured to the walls of the opening. As so fixed to the axle the bracket 30 extends above and below the axle. At their upper ends the portions 31 are formed with a pair of alined and flanged cylindrical ears 34, and at their lower ends with a pair of alined and flanged cylindrical ears 35.

As shown in FIGS. 1 and 2 the top 17 of each hanger 16 is formed fore and aft with a pair of alined and cylindrical ears 36 and 37. Likewise, the seat member 22 is formed at its lower end fore and aft with a pair of alined and cylindrical ears 38 and 39, best seen in FIG. 4.

My spring suspension also includes two pairs of radius rods R and R–1, and the rods 40 and 41 of the pair R are positioned one above the other and formed at their opposite ends with cylindrical transverse sleeves 42 and 43. The sleeve 42 of the upper rod 40 is received between the ears 34 of that bracket 30 fixed to the axle 11, while the sleeve 43 is received between the ears 36. The sleeve 42 of the lower rod 41 is received between the ears 35 of the bracket 30, while the sleeve 43 is received between ears 38 of the seat member 22.

Bolts 44 extend through all of the sleeves and ears for coupling them to each other, and rubber bushings (not shown) are contained within the sleeves and the ears to allow limited rotation of the two relatively. Thus pivoted joints are provided between the ends of the radius rods and the brackets at one end, and the hanger 16 and seat member 22 at the other end. Manifestly, this arrangement of rods, bracket and seat member defines a parallelogram.

The radius rods 45 and 46 of the other pair R–1 are likewise positioned one above the other. Each rod 45 or 46 is of tubular form and the opposite ends thereof are interiorly screw-threaded as at 47 (see FIG. 8) to receive solid stems 48 that are exteriorly screw-threaded as at 49 so as to afford adjustment of the rod longitudinally on the stems to increase or decrease the effective overall length of the rod and stems.

Such adjustment can be maintained by longitudinally splitting each rod end as at 50 and seating a clamp 51 in an annular groove 52 in the rod, the clamp being provided with a lateral U-shaped portion 53 through which a bolt 54 extends for constricting the clamp to in turn constrict the split portion of the rod and thus secure the rod against turning on the stem. The screw-threads in one end of the rod extend oppositely from the screw-threads in the other end of the rod, that is, left-hand threads in one instance and right-hand threads in the other.

The two stems 48 have sleeves 55 formed transversely thereon and the sleeves for the lower rod 45 are received respectively between the ears 39 on the seat member 22 and the ears 35 on that bracket 30 fixed to the axle 12. The sleeves 55 of the stems of the upper rod 46 are received respectively between the ears 34 of that bracket 30 fixed to the axle 12 and the ears 37 of the hanger 16.

As in the case of the ears 34 and 35 and the sleeves 42 and 43 bolts 56 extend through the ears 34 and 35 and the sleeves 55 for pivotally coupling them to each other, and here again rubber bushings (not shown) are contained within the ears of the sleeves to allow limited rotation of the two relatively, the construction being shown in detail in my United States Patent 2,819,105.

Here again the arrangement of the radius rods R–1 in relation to the hanger 16, bracket 30 and seat 22, defines a parallelogram.

As shown in FIG. 1 the radius rods R and R–1 at one side of the frame 10 are reversely arranged with respect to those at the other side of the frame so that by adjustment of the rods R–1 at either side of the frame the axles 11 and 12 can be alined with the trunnion 15.

The spring suspension of my invention differs from previously designed suspensions in two major respects. First, instead of the upper radius rods 40 and 46 being pivotally connected to the spring beam 20 they are connected to the hanger 16. Second, the inner ends of the lower rods 41 and 45 are pivotally connected to the seat member 22 and at points such that the longitudinal centers of these rods are on a line intersecting the trunnion 15. It is by virtue of these differences that the suspension operates in the following manner:

During travel of the vehicle over a road which is undulated, the consequent up and down movements of the wheels alternately, and the concurrent arcuate movements of the axles 11 and 12 about the trunnion 15 as a center, results in oscillation of the assembly resisted only by the spring beam 20 which as mounted on the trunnion is free to oscillate independently of the hanger 16. When the brakes 14 are applied to the wheels the resultant torque produced in the axles which tends to rotate them with the wheels produces forces which are transmitted axially to the upper rod 40 in a direction away from the hanger 16 thereby tensioning rod 40 and in the rod 46 in a direction toward the hanger, thereby placing this rod in compression. The braking torque acts in a similar but reverse manner on the lower pair of rods 41, 45, placing rod 41 in compression and rod 45 in tension. Since the hanger is fixed to the vehicle frame these forces cannot be transmitted from one axle to the other, nor to the spring beam 20 and thus they do not effect the position of the spring beam 20 about the trunnion for reasons now to be explained. Thus, since center lines drawn through lower rods 41 and 45 intersect the axis of trunnion 15, torque forces imposed on these rods are ineffective to rotate spring beam 20 in either direction and, hence, the torque forces imposed on one rod cannot be transmitted to the other rod nor transmitted to the spring. As a consequence of this mode of operation of the suspension, the torque imposed on the axles as a result of a brake application cannot operate to produce hopping of the wheels. Although the pairs of radius rods to either side of each hanger have been referred to above in describing the invention, it will be understood these rods may also be referred to as upper pairs 40, 46 and lower pairs 41, 45, the latter designation being employed and found convenient when defining novel aspects of the invention in the claims.

Although I have herein shown and described only one form of spring suspension for dual axles for vehicles embodying my invention, it is to be understood that various changes and modifications may be made herein without departing from the spirit of my invention and the spirit and scope of the appended claims.

What I claim is:

1. A spring suspension for supporting a vehicle frame on a pair of axles, including for each side of said frame a hanger fixed to said frame; a trunnion supported in said hanger; a spring beam supported at opposite ends on one end of each of said axles, and its medial portion extending through said hanger; a saddle at the upper side of said beam within said hanger; a seat at the lower side of said beam within said hanger; means clamping said saddle to said seat; means mounting said seat for rotation on said trunnion so that said beam is supported for rocking movement in said hanger; a bracket fixed to each axle and extending above and below the same; two pairs of radius rods extending in opposite directions from said hanger, the rods of each pair disposed one above the other with the upper rod pivoted at its inner end to the upper end of said hanger and at its outer end pivoted to that part of the bracket extending above the corresponding axle, and the inner end of the lower rod pivoted to said seat and the outer end thereof pivoted to that portion of the bracket extending below the axle, the centers of the pivot connections of each lower rod being in alignment with the axis of said trunnion whereby said pairs of radius rods cooperate with one another to counteract braking torque and to isolate braking torque from said spring beam thereby to prevent brake hopping.

2. A tandem spring suspension for supporting a vehicle frame on a pair of axles transversely of said frame, a pair of inverted U-shaped hangers fixed to opposite sides of said frame between said axles; a trunnion shaft fixed at its ends in the lower ends of said hangers; a pair of spring beams having their medial portions extending between the legs of said hangers with their ends supported by said axles; means including seats for pivotally supporting the medial portions of said beams on the trunnion shaft between the legs of said hangers so that said beams can rock on the latter; brackets fixed to said axles and having portions extending above and below said axles; two pairs of radius rods at each side of said frame and extending in opposite directions from said hanger; the rods of each pair disposed one above the other with the upper rod pivoted at its inner end to the respective hanger at a point above said shaft, and its outer end pivoted to that portion of the respective bracket extending above the corresponding axle, the inner ends of the lower pair of said rods being pivoted to said seat on the opposite sides of said shaft, and their outer ends being pivoted to the respective brackets below the corresponding axle, and in such manner that a line through the pivots of each lower rod are on a line intersecting the trunnion shaft.

3. A spring suspension according to claim 2, wherein one pair of radius rods at one side of said frame and the diagonally opposite pair at the other side of said frame are provided with means affording lengthwise adjustment thereof for aligning said axles with respect to said frame.

4. A heavy duty spring suspension unit for a pair of axles arranged in tandem, a pair of generally similar spring suspension assemblies interconnecting the opposite ends of said axles, each of said assemblies including an inverted U-shaped hanger attachable to the underside of a vehicle frame midway between said axles, a spring beam having its midportion extending through said hanger between the sides thereof and its opposite ends bearing against said axles, saddle bracket means secured to the midportion of said spring beam and positioned between the sides of said hanger, a cross axle rigidly interconnecting the two hangers of said pair of suspension assemblies and having a journal connection with said saddle bracket means, upper and lower pairs of radius rods with the members of each pair projecting in opposite directions from the midportion of said spring beam with the upper pair being disposed above said spring beam and the lower pair being disposed therebelow, means resiliently and pivotally connecting the inner adjacent ends of the upper pair of rods to the upper portion of said hanger and the outer ends thereof to upwardly projecting bracket means mounted on said axles, means resiliently and pivotally connecting the inner adjacent ends of said lower pair of rods to said saddle means and the outer ends thereof to downwardly projecting portions of said axle-mounted bracket means, longitudinal axes of lower pair of radial rods intersecting said transverse shaft closely adjacent the longitudinal axis thereof thereby to isolate said spring beam from the effects of braking torque acting on said axles when undergoing braking in service.

5. A heavy duty spring suspension unit as defined in claim 4 characterized in that one of each pair of said radius rods on a given suspension assembly includes means for adjusting the length thereof while assembled to said brackets, and wherein the adjustable ones of said rods on said pair of suspension assemblies are associated with a different one of said axles whereby either axle may be adjusted as necessary to lie at right angles to the longitudinal axis of a vehicle on which said suspension unit is mounted.

6. In a heavy duty tandem spring suspension assembly for road vehicles effective to prevent brake hopping while keeping the assembly wheels in efficient braking contact with the roadway, said assembly being of the type having a pair of brake-equipped carriages having parallel axles supporting the ends of a pair of spring beams located adjacent the ends of the axles, the mid-portions of said spring beams being pivoted in hangers rigid with overlying portions of the vehicle frame; that improvement in maintaining braking effectiveness and in preventing brake hopping which comprises pairs of vertically spaced parallel torque rods extending lengthwise of said vehicle and spaced above and below said carriage axles, bracket means rigid with said axles pivotally connected to the outer ends of said rods, means movably connecting the inner ends of the upper pair of rods to said vehicle adjacent said hanger, means movably connecting the inner ends of the lower pair of rods to said spring beam with the projected longitudinal axes of said lower rods intersecting one another substantially at the pivot axis of said spring beam whereby the torquing of said carriage axles incident to the braking of the carriage is transmitted directly to the vehicle frame without tending to pivot said spring beams about its pivot connection to said hangers.

7. A tandem spring suspension as defined in claim 6 characterized in the provision of common shaft means extending transversely of said vehicle with its opposite ends supported in the respective ones of said hangers, and means for securing said spring beams pivotally to said shaft means closely adjacent the respective ones of said hangers, and means for holding said shaft means detachably assembled to said hangers.

8. A tandem spring suspension assembly as defined in claim 7 characterized in the provision of means for detachably holding said upper torque rods to the vehicle frame whereby said complete spring suspension assembly may be disconnected and detached from the vehicle as a unit by detaching said shaft means and disconnecting said upper torque rods.

9. A tandem spring suspension assembly as defined in claim 6 characterized in that said hangers comprising unitary inverted U-shaped members straddling the mid-portions of said spring beams, shaft means pivotally connected to the mid-portions of said beams and detachably secured to aligned openings through said bracket legs, and means for detachably securing the inner ends of said upper torque rods to said frame near the upper end of said hangers whereby the disconnection of said shaft means and of said last mentioned torque rod connections permits the spring suspension assembly to be removed from beneath the vehicle as a unitary assembly.

References Cited in the file of this patent

UNITED STATES PATENTS

| | | |
|---|---|---|
| 2,096,530 | Alden | Oct. 19, 1937 |
| 2,665,141 | Lindblom | Jan. 5, 1954 |
| 2,734,755 | Van Raden | Feb. 14, 1956 |
| 2,825,415 | Boughner | Mar. 4, 1958 |
| 2,841,413 | Pringle | July 1, 1958 |
| 2,951,709 | Ward | Sept. 6, 1960 |